United States Patent

Schmidli

[11] Patent Number: 5,682,737
[45] Date of Patent: Nov. 4, 1997

[54] METHOD FOR STARTING UP A COMBINATION GAS AND STEAM POWER PLANT

[75] Inventor: Jürg Schmidli, Baden, Switzerland

[73] Assignee: Asea Brown Boveri AG, Baden, Switzerland

[21] Appl. No.: 667,871

[22] Filed: Jun. 20, 1996

[30] Foreign Application Priority Data

Aug. 8, 1995 [DE] Germany ............... 195 29 110.7

[51] Int. Cl.$^6$ .................. F02C 7/26; F02C 6/18
[52] U.S. Cl. ............. 60/39.02; 60/39.141; 60/39.182
[58] Field of Search .................. 60/39.02, 39.141, 60/39.142, 39.181, 39.182, 39.463, 39.465

[56] References Cited

U.S. PATENT DOCUMENTS

| | | | |
|---|---|---|---|
| 2,826,038 | 3/1958 | Shannon et al. | 60/39.181 |
| 4,212,160 | 7/1980 | Blaskowski | 60/39.182 |
| 5,148,668 | 9/1992 | Frutschi | 60/39.182 |
| 5,329,757 | 7/1994 | Faulkner et al. | 60/39.465 |

FOREIGN PATENT DOCUMENTS

| | | |
|---|---|---|
| 0083109A2 | 7/1983 | European Pat. Off. . |
| 3413241A1 | 6/1985 | Germany . |
| 3915478A1 | 11/1989 | Germany . |

*Primary Examiner*—Louis J. Casaregola
*Attorney, Agent, or Firm*—Burns, Doane, Swecker & Mathis, L.L.P.

[57] ABSTRACT

In a method for starting up a combination plant designed as a single-shaft plant with a common shafting (10) and essentially consisting of a compressor (1), a combustion chamber (2), a turbine (3), a steam turbine (5), a generator (6) and a fuel compressor (4) for compressing low-calorie fuels (12), the steam turbine (5) is started up by means of extraneous steam (33) introduced into the steam turbine. The gas turbine (1, 2, 3) is started up by means of the steam turbine (5), medium-calorie or high-calorie auxiliary fuel (21) is ignited in the combustion chamber (2) and the shafting (10) is run at nominal speed. The power required for compressing the low-calorie fuel (12) in the fuel compressor (4) is applied by means of the auxiliary fuel (21) and the extraneous steam (33) and, when there is sufficient pressure in the fuel compressor (4), a changeover is made from the auxiliary fuel (21) to the low-calorie fuel (12).

3 Claims, 1 Drawing Sheet

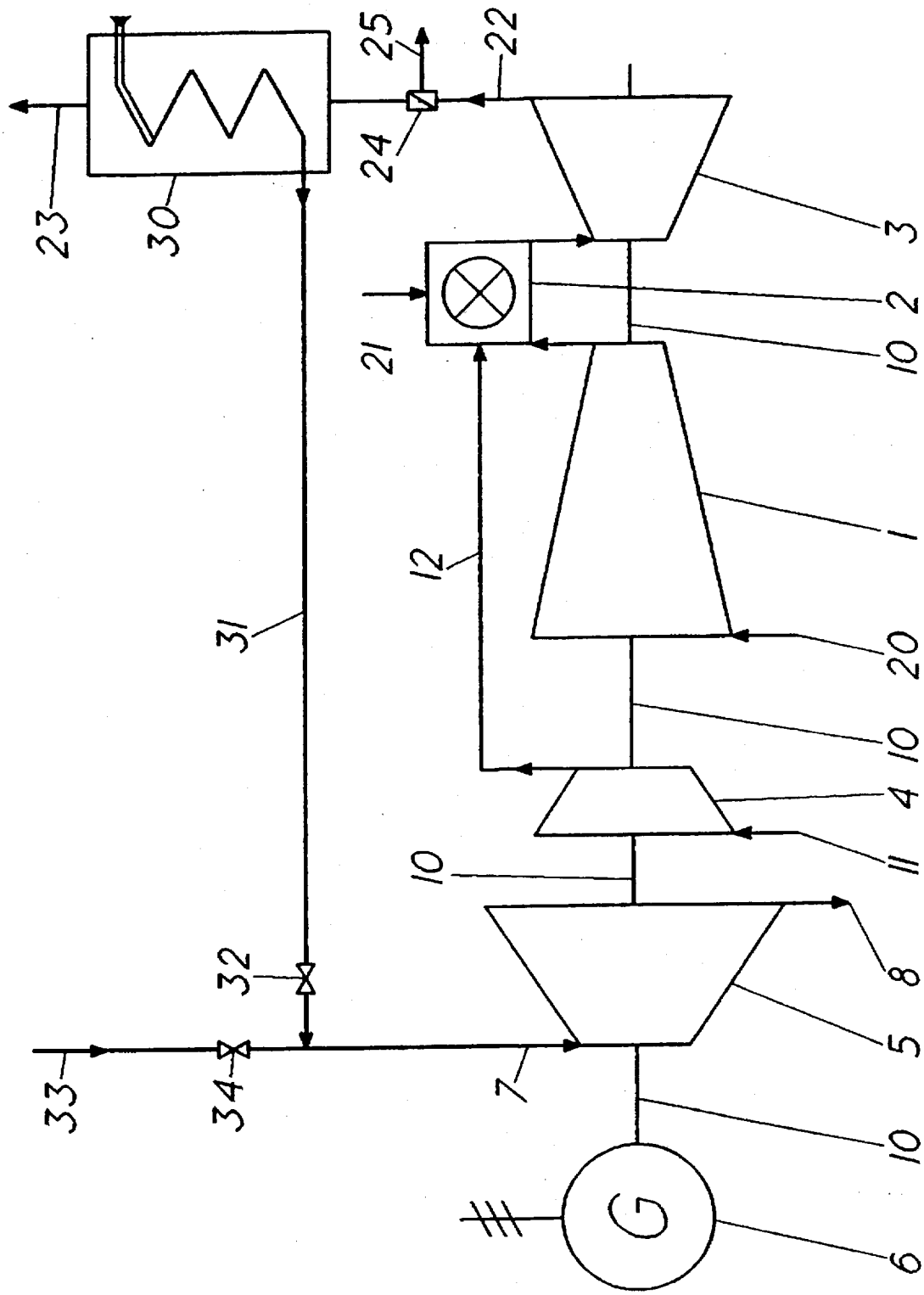

METHOD FOR STARTING UP A COMBINATION GAS AND STEAM POWER PLANT

BACKGROUND OF THE INVENTION

1. Field of the Invention

The invention relates to a method for starting up a combination plant designed as a single-shaft plant with a common shafting and essentially consisting of a compressor, a combustion chamber, a turbine, a steam turbine, a generator and a fuel compressor for compressing low-calorie fuels.

2. Discussion of Background

Methods of this type for starting up a combination plant designed as a single-shaft plant with a common shafting are known.

In contrast to gas turbines which are operated with conventional-medium-calorie or high-calorie fuels, such as natural gas or oil, with a calorific value of 40 MJ/kg or above, gas turbines using a low-calorie fuel with a calorific value of the order of magnitude of 2 to 4 MJ/kg require a special fuel compressor. This fuel compressor needs considerable power in order to compress the fuel quantity.

For starting up the gas turbine and the steam turbine, therefore, special startup devices are used in order to bring the turbines to nominal speed.

SUMMARY OF THE INVENTION

Accordingly, one object of the invention is to develop a cost-effective and simple startup method for starting up a combination plant of the initially mentioned type designed as a single-shaft plant with a common shafting.

This is achieved, according to the invention, in that the steam turbine is started up by means of extraneous steam introduced into the steam turbine, in that the gas turbine is started up by means of the steam turbine, in that medium-calorie or high-calorie auxiliary fuel is ignited in the combustion chamber, in that the shafting is run at nominal speed, in that the power required for compressing the low-calorie fuel in the fuel compressor is applied by means of the auxiliary fuel and the extraneous steam, and in that, when there is sufficient pressure in the fuel compressor, a changeover is made from the auxiliary fuel to the low-calorie fuel.

The advantages of the invention are to be seen inter alia in that a special startup device can be dispensed with. It must be remembered, however, that, even under low loads, oil or natural gas flames have a higher heat emission than a low-calorie flame.

It is therefore particularly expedient if the exhaust gases of the turbine are used for the production of steam in a waste heat boiler, the steam occurring is introduced, in addition to the extraneous steam, into the steam turbine, and the power required for compressing the low-calorie fuel in the fuel compressor is applied by means of the auxiliary fuel, the extraneous steam and the steam generated in the waste heat boiler.

The demand for auxiliary fuel can therefore be minimized, thus resulting in considerable cost savings for the operator of the combination plant. The combustion chamber now has to be designed only for low-calorie operation, with the result that water injection or regulatable air distribution in the combustion chamber can be dispensed with. The combination plant consequently becomes simpler and cheaper. Furthermore, the demand for extraneous steam is also reduced.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawing, wherein an exemplary embodiment of the invention is illustrated by means of a diagrammatic representation of a combination plant.

Only the elements essential for understanding the invention are shown. Of the plant, for example, the mountings of the shafts, the complete water/steam circuit and the exciter assigned to the generator are not represented.

The directions of flow of the working media are designated by arrows.

DESCRIPTION OF THE PREFERRED EMBODIMENT

Referring now to the drawing, in the figure a common shafting 10 connects a gas turbine, essentially consisting of a compressor 1, combustion chamber 2 and actual turbine 3, a fuel compressor 4, a steam turbine 5 and a generator 6. The common shafting 10 is formed by individual shafts which are connected via couplings not represented in more detail.

In the compressor 1, the air sucked in via an air inlet 20 is compressed and the compressed air is guided into the combustion chamber 2. There, fuel in the form of auxiliary fuel 21 or of compressed low-calorie fuel 12 is supplied to the combustion air and the fuel/air mixture is burnt in a combustion space. The hot gas which has occurred is guided into the turbine 3, where it is expanded and some of the energy of the hot gas is converted into rotational energy. The still hot exhaust gases are supplied via an exhaust gas conduit 22 to a waste heat boiler 30. Located in the exhaust gas conduit 22 is an exhaust gas valve 24, via which the exhaust gases can be guided to the waste heat boiler 30 or directly into an exhaust gas chimney 25. In the waste heat boiler 30, heat energy is extracted from the exhaust gas and with this water is evaporated. After the heat energy has been emitted, the exhaust gas is guided into the open via a chimney 23. The steam which has occurred is guided via a steam conduit 31 to a steam inlet 7 of the steam turbine and is used to operate the single-stage or multi-stage steam turbine 5. The steam emerging at the steam outlet 8 is condensed and is supplied to the waste heat boiler 30 again. Additional extraneous steam can be introduced into the steam turbine 5 via an extraneous steam conduit 33. The steam turbine 5 is designed in each case according to the steam from the waste heat boiler 30, since the fraction of extraneous steam is usually smaller by a multiple.

Since low-calorie fuels as a rule occur during a process in which steam is also required, for example the manufacture of steel, a special startup device can be dispensed with. The steam turbine 5 can be used, by means of the extraneous steam, in order to run up the combination plant.

Since the fuel compressor 4 has a power-optimized design, as a rule it produces only from nominal speed the pressure which is required for injecting the low calorie fuel. For this purpose, the fuel compressor 4 needs a particular power (for example, 40 MW) which is dependent on the size of the combination plant and which cannot be applied solely by the steam turbine 5 by means of the extraneous steam. A medium-calorie of high-calorie auxiliary fuel, as a rule natural gas or oil, is therefore required in order to run up the plant.

When a turbine plant is being started up, it is in each case broken away via a shaft rotating device, not shown, preheated with steam and brought to a specific rotational speed. During the startup, of course, the adjustable guide vane cascades, not shown, of the compressors 1, 4 are closed.

In a first startup example, extraneous steam is introduced into the steam turbine via the extraneous steam conduit 33, with the valve 34 opened. The valve 32 in the steam conduit 31 remains closed. When the power and rotational speed of the shafting 10 are sufficient, the guide vane cascades of the air compressor 1 are opened and the auxiliary fuel 21 (oil, natural gas, etc.) injected into the combustion chamber is ignited. The gas turbine 3 can then be used for the further runup of the combination plant. The exhaust gas valve 24 in the exhaust gas conduit 22 guides the exhaust gases into the exhaust gas chimney 25. After the nominal speed has been reached, the shafting 10 is synchronized and the power of the turbine 3 is increased. When sufficient excess power is available on the shaft 10, the adjustable guide vane cascades of the fuel compressor 4 are opened. The power requirement of the fuel compressor 4 rises and, when the pressure of the fuel compressor is sufficient, a changeover is made to the low-calorie fuel 12. Until a sufficient pressure prevails in the fuel compressor 4, the low-calorie fuel is recirculated via a return conduit, not shown, and a cooler. Depending on the components 5, 4, 1, 3 which are used, this operation can be concluded only after an approximately 40% load of the gas turbine. The startup operation is thus concluded, the exhaust gas valve 24 is changed over and steam is produced in the waste heat boiler 30.

In this startup method, the combustion chamber 2 must be designed for the higher heat emission of the auxiliary fuel 21. For this purpose, water is injected into the combustion chamber 2, thus reducing the temperature and radiation, or regulatable air distribution is built into the combustion chamber 2.

In a second startup example, extraneous steam is introduced into the preheated steam turbine 5 via the extraneous steam conduit 33, with the valve 34 opened. The valve 32 in the steam conduit 31 for the moment remains closed. When the power and rotational speed of the shafting 10 are sufficient, the guide vane cascades of the compressor 1 are opened and the auxiliary fuel 21 injected into the combustion chamber is ignited. The turbine 3 can then be used for the further runup of the combination plant. When the exhaust gas temperature of the turbine 3 is sufficient (approximately 450° C.), the exhaust gas valve 24 in the exhaust gas conduit 22 is changed over, so that the exhaust gases are guided into the waste heat boiler 30. The valve 32 in the steam conduit 31 is opened and the steam produced in the waste heat boiler 30 is transferred to the steam turbine 5. At nominal speed, the shafting 10 is synchronized and the adjustable guide vane cascades of the fuel compressor 4 are opened. The power then required is furnished via the steam produced in the waste heat boiler 30 and the extraneous steam, so that the proportion of extraneous steam is minimized. The turbine 3 can therefore remain at a low power level of less than 10% power. At most sufficient auxiliary fuel 21 is burnt in the combustion chamber 2 to ensure that the heat load there becomes no higher than with low-calorie fuel 12 under full load. Since the turbine 3 then has to provide less than 10% power, the auxiliary fuel consumption and also the pressure in the turbine are lower than in the first startup method. The fuel compressor 4 consequently needs a lower shaft power to change over to low-calorie fuel 12. As a result, a changeover to low-calorie operation can be made earlier, thus additionally lowering the consumption of auxiliary fuel and therefore necessitating a smaller cooler in the return conduit. On account of the relatively low temperatures in the combustion chamber 2, water injection or regulatable air distribution can be dispensed with.

After the startup and changeover operation is concluded, the extraneous steam is cut off by means of the valve 34.

Of course, the invention is not restricted to the exemplary embodiments shown and described. In the second example, the exhaust gas valve can be dispensed with, a steam bypass conduit then usually being provided. The design of the waste heat boiler is represented merely diagrammatically and can be any desired.

Obviously, numerous modifications and variations of the present invention are possible in light of the above teachings. It is therefore to be understood that, within the scope of the appended claims, the invention may be practiced otherwise than as specifically described herein.

What is claimed as new and desired to be secured by letters patent of the United States is:

1. A method for starting up a combination plant designed as a single-shaft plant with common shafting (10) and essentially consisting of a compressor (1), a combustion chamber (2), a turbine (3), a steam turbine (5), a generator (6) and a fuel compressor (4) for compressing low-calorie fuels (12), wherein the steam turbine (5) is started up by means of extraneous steam (33) introduced into the steam turbine, wherein the gas turbine (1, 2, 3) is started up by means of the steam turbine (5), wherein medium-calorie or high-calorie auxiliary fuel (21) is ignited in the combustion chamber (2), wherein the shafting (10) is run at nominal speed, wherein .the power required for compressing the low-calorie fuel (12) in the fuel compressor (4) is applied by means of the auxiliary fuel (21) and the extraneous steam (33), and wherein, when there is sufficient pressure in the fuel compressor (4), a changeover is made from the auxiliary fuel (21) to the low-calorie fuel (12).

2. The startup method as claimed in claim 1, wherein the exhaust gases of the turbine (3) are used for the production steam in a waste heat boiler (30), wherein the steam (31) occurring is introduced, in addition to the extraneous steam (33), into the steam turbine (5), and wherein the power required for compressing the low-calorie fuel (12) in the fuel compressor (4) is applied by means of the auxiliary fuel (21), the extraneous steam (33) and the steam generated in the waste heat boiler (30).

3. The startup method as claimed in claim 1, wherein at most sufficient auxiliary fuel (21) is burnt in the combustion chamber (2) to ensure that the heat load there becomes no higher than with low-calorie fuel (12) under full load.

* * * * *